(12) United States Patent
McCarty et al.

(10) Patent No.: US 8,696,231 B2
(45) Date of Patent: Apr. 15, 2014

(54) LOAD RELIEVING STEM CONNECTORS

(75) Inventors: Michael Wildie McCarty, Marshalltown, IA (US); Thomas Adam Brandau, Grundy Center, IA (US); Galen Dale Wilke, Ames, IA (US); Michael Melvin Anderson, Marshalltown, IA (US); Doug Gethmann, Gladbrook, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 606 days.

(21) Appl. No.: 11/314,620

(22) Filed: Dec. 21, 2005

(65) Prior Publication Data

US 2007/0164560 A1 Jul. 19, 2007

(51) Int. Cl.
*F16B 2/02* (2006.01)
*F16B 7/04* (2006.01)
*F16D 1/02* (2006.01)

(52) U.S. Cl.
USPC ....... 403/314; 403/312; 403/374.1; 251/61.2; 251/285

(58) Field of Classification Search
USPC ......... 403/305, 307, 309, 310, 312, 313, 314, 403/373, 374.1; 251/61.2, 61.5, 77, 284, 251/285; 92/140
See application file for complete search history.

(56) References Cited

U.S. PATENT DOCUMENTS

| | | | | |
|---|---|---|---|---|
| 766,093 | A * | 7/1904 | Albrand | 277/519 |
| 1,944,141 | A * | 1/1934 | Stidd | 403/310 |
| 2,093,403 | A * | 9/1937 | Sertillange | 174/90 |
| 2,158,892 | A * | 5/1939 | Becker | 439/863 |
| 2,508,668 | A * | 5/1950 | Gascoigae | 403/293 |
| 2,968,505 | A * | 1/1961 | Scaramucci | 277/330 |
| 3,003,600 | A * | 10/1961 | MacKenzie | 52/633 |
| 3,960,358 | A | 6/1976 | Vollmer et al. | |
| 4,574,881 | A * | 3/1986 | Bednarz | 166/75.11 |
| 4,752,151 | A * | 6/1988 | Ashida et al. | 403/267 |
| 4,799,819 | A * | 1/1989 | Swoboda | 403/252 |
| 5,020,934 | A * | 6/1991 | Floren et al. | 403/306 |
| 5,049,031 | A * | 9/1991 | Mintenko et al. | 415/112 |

(Continued)

FOREIGN PATENT DOCUMENTS

| | | |
|---|---|---|
| FR | 2558904 | 8/1985 |
| WO | 2004072493 | 8/2004 |

OTHER PUBLICATIONS

International Search Report for international patent application serial No. PCT/US2006/043851, 4 pages.

(Continued)

*Primary Examiner* — Daniel P. Stodola
*Assistant Examiner* — Nahid Amiri
(74) *Attorney, Agent, or Firm* — Hanley, Flight & Zimmerman LLC

(57) ABSTRACT

Apparatus for operatively connecting an actuator rod to a valve stem is disclosed. An example apparatus includes a connector housing having an outer surface and an inner surface where the inner surface defines an internal cavity. The example apparatus also includes an actuator rod passage extending from the outer surface into the internal cavity that is adapted to receive at least a portion of the actuator rod and a valve stem passage extending from the outer surface into the internal cavity that is adapted to receive at least a portion of the valve stem. Additionally, the example apparatus includes a load relieving body disposed within the internal cavity between the actuator rod passage and the valve stem passage.

27 Claims, 7 Drawing Sheets

(56) References Cited

U.S. PATENT DOCUMENTS

| | | | | |
|---|---|---|---|---|
| 5,052,430 A | * | 10/1991 | Trautwein | 137/315.35 |
| 5,082,391 A | | 1/1992 | Florida | |
| 5,269,619 A | * | 12/1993 | Warkus et al. | 403/240 |
| 5,308,184 A | | 5/1994 | Bernard | |
| 5,531,536 A | * | 7/1996 | Blanchfield et al. | 403/340 |
| 5,577,857 A | * | 11/1996 | Miyasaka et al. | 403/316 |
| 5,600,096 A | * | 2/1997 | Cherry et al. | 174/84 R |
| 5,769,122 A | | 6/1998 | Baumann et al. | |
| 6,042,081 A | | 3/2000 | Anderson | |
| 6,116,573 A | * | 9/2000 | Cornette et al. | 251/214 |
| 6,135,670 A | * | 10/2000 | Bahnman et al. | 403/373 |
| 6,328,499 B1 | * | 12/2001 | Reding et al. | 403/299 |
| 6,622,987 B2 | * | 9/2003 | Sterud | 251/214 |
| 6,742,993 B2 | * | 6/2004 | Savard et al. | 417/53 |
| 6,814,523 B1 | * | 11/2004 | Nilsson | 403/305 |
| 6,886,805 B2 | | 5/2005 | McCarty | |
| 6,905,108 B2 | * | 6/2005 | Hall et al. | 251/285 |
| 7,204,525 B2 | * | 4/2007 | Matzner | 285/367 |
| 2004/0155216 A1 | | 8/2004 | McCarty | |
| 2004/0155219 A1 | | 8/2004 | McCarty | |

OTHER PUBLICATIONS

Written Opinion of the International Searching Authority for international patent application serial No. PCT/US2006/043851, 6 pages.

Fisher, "Type D2 FloPro Control Valve," Dec. 2004, 6 pages.

Anderson Greenwood Crosby, "Maintenance Instructions for Pilot Operated Safety Relief Vent with Non-Flowing Modulating Pilot Series 9200," May 1993, 31 pages.

Fisher, "easy-e Globe-Style Control Valves," Oct. 1998, 28 pages.

Fisher, "Design D and DA Control Valves," Aug. 2002, 12 pages.

Daniel, "Gas Loaded Relief/Back Pressure Valves," May 2001, 8 pages.

Bettis Acutators & Controls, "Service Manual No. I-0004, E-Series Rotary and Linear Operators," Jun. 6, 1996, 18 pages.

FlowBizVA.com, "Rotary Valve Designs for Control Applications," May 9, 2005, 3 pages.

The Notification of the First Office Action, issued by State Intellectual Property Office of P.R, China on Mar. 25, 2010, in connection with Chinese Application No. 200680051609.5, 10 pages.

Russian Office Action, issued by the Russian State Intellectual Property Office in connection with Russian Application No. 2008126808, issued on Oct. 27, 2010, 3 pages.

"The Notification of the Second Office Action," issued by the State Intellectual Property Office of P.R. China, in connection with Chinese Application No. 200680051609.5, on Aug. 17, 2010, 4 pages.

Examiner's First Report, issued by the Australian Government, in connection with Australian Patent Application No. 2006330102, on May 13, 2011, 2 pages.

Notice of Reasons for Rejection, issued by the Japanese Patent Office in connection with J.P. Application No. 2008-547231, on Jul. 26, 2011, 2 pages.

Australian Office Action issued by the Australian Intellectual Property Office in connection with Australian patent application No. 2006330102, on Nov. 8, 2012, 2 pages.

* cited by examiner

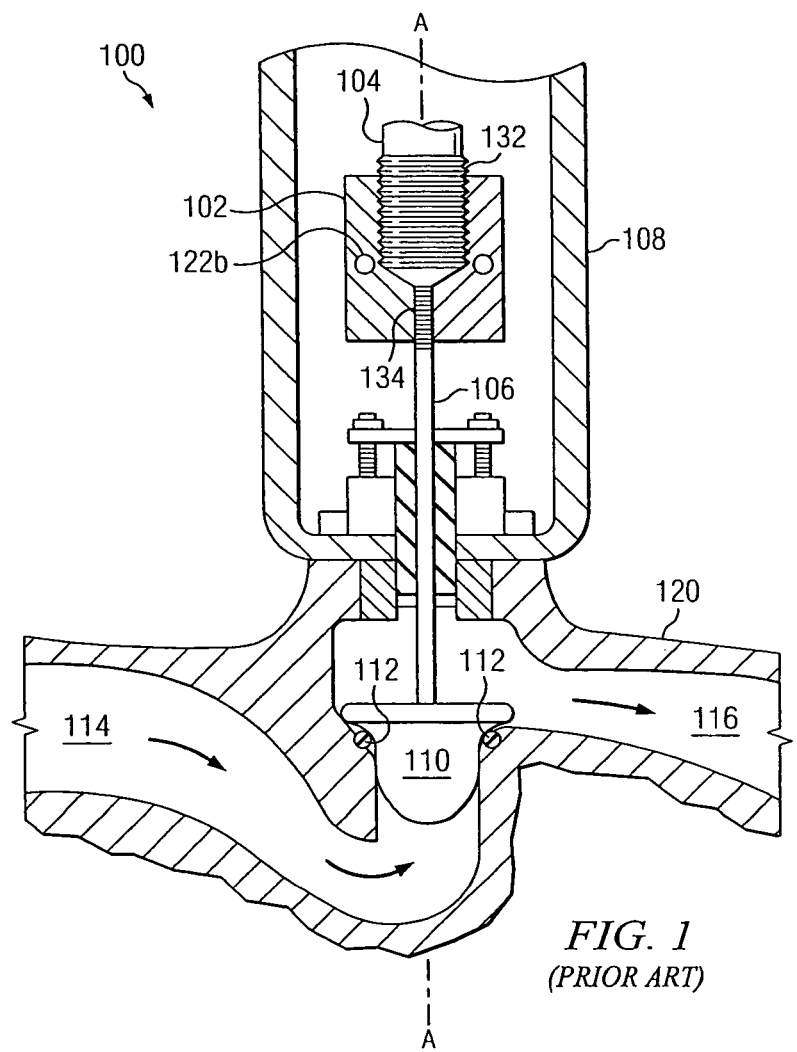
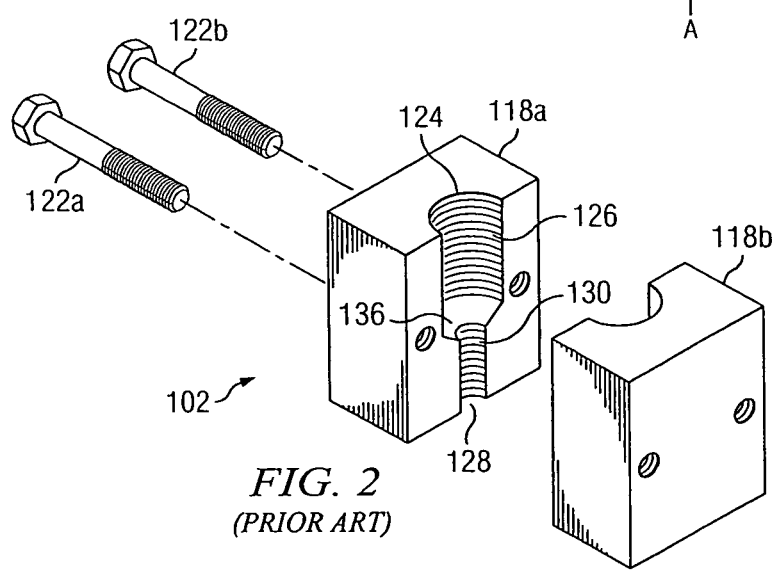
FIG. 1
(PRIOR ART)
FIG. 2
(PRIOR ART)

LOAD RELIEVING STEM CONNECTORS

FIELD OF THE DISCLOSURE

This disclosure relates generally to assemblies for coupling shafts or rods and, more specifically, to a load relieving stem connector and method for coupling, for example, an actuator rod to a control valve stem.

BACKGROUND

Control valves are typically operated by an actuator, such as a pneumatic actuator, an electric actuator, a hydraulic actuator, etc. The actuator is typically coupled to the control valve and provides the force to move a valve plug to control a fluid flowing through the control valve. For instance, in a pneumatic actuator, increasing or decreasing air pressure moves a diaphragm, which in turn moves an actuator rod that is attached to the center of the diaphragm along the longitudinal axis of an actuator housing. Thus, changes in the air pressure correspond directly to changes in the axial position of the actuator rod.

The actuator rod may be attached to a valve stem that protrudes from the valve body. By mechanically coupling the actuator rod to the valve stem via a valve stem connector, the position of the attached valve plug can be determined by the actuator rod to control the fluid flowing through the valve. Typically, the valve stem connector consists of a single, rigid, connector that includes two threaded cavities for receiving externally threaded ends of the actuator rod and valve stem. However, known valve stem connectors may suffer from certain manufacturing disadvantages and design limitations.

FIGS. 1 and 2 show a cross-sectional view of one example of a typical valve assembly 100 that includes a valve stem connector 102 mechanically fastening an actuator rod 104 to a valve stem 106. The actuator rod 104 is housed in an actuator 108, for example, a pneumatic actuator, and when a supplied air pressure to the actuator 108 changes, the actuator rod 104 moves along a longitudinal axis A-A. The valve stem connector 102 couples the axial motion supplied by the actuator rod 104 through the valve stem 106 to a valve plug 110, which is located in a valve body 120, to allow the valve plug 110 to be positioned relative to a valve seat 112. For example, when the valve plug 110 is positioned away from the valve seat 112, fluid can flow from a valve inlet 114 to a valve outlet 116 as indicated by the arrows shown.

As shown in greater detail in FIG. 2, the illustrated valve stem connector 102 includes two connector portions 118a-b that are fastened by bolts 122a-b to form a rigid connector. The valve stem connector 102 has a threaded upper cavity 124 that includes a plurality of threads 126 to threadingly engage the actuator rod 104. Similarly, the valve stem connector 102 has a threaded lower cavity 128 that includes a plurality of threads 130 to threadingly engage the valve stem 106. The actuator rod 104 and the valve stem 106 are joined when the upper threads 126 and the lower threads 130 mechanically engage corresponding external threads 132 and 134 (FIG. 1) on the actuator rod 104 and the valve stem 106, respectively. In this example, because the actuator rod 104 and the valve stem 106 have different diameters, the upper cavity 124 and the lower cavity 128 are connected via a tapered internal surface 136.

To complete the valve assembly 100, the actuator rod 104 and the valve stem 106 are threaded in counter-rotating directions into the cavities 124 and 128, respectively, until the desired length is achieved so that the valve stem 106 and the plug 110 properly interact with the valve seat 112. Axial adjustment of the actuator rod 104 and the valve stem 106 is typically limited by the minimum number of threads that must be engaged to create a secure and safe mechanical connection. Finally, the bolts 122a-b may be tightened to create additional compressive load between the threads 126, 130, 132, and 134 to securably fasten the actuator rod 104 to the valve stem rod 106.

As mentioned above, in a pneumatically controlled valve assembly, a diaphragm (not shown) is coupled to the actuator rod 104, the position of which is controlled by the pressure on one side of the diaphragm and one or more springs on the opposite side of the diaphragm. By controlling the pressure in the space above the diaphragm, a direct-acting actuator is created. By controlling the pressure below the diaphragm, a reverse-acting actuator 104 is created. Movement of the diaphragm and, thus, the actuator rod 104 causes the valve stem 106 to open and close the valve plug 110 relative to the valve seat 112 to control the fluid flow through the valve body 120.

SUMMARY

In accordance with one example, an apparatus for operatively connecting an actuator rod to a valve stem includes a connector housing having an outer surface and an inner surface where the inner surface defines an internal cavity. The apparatus further includes an actuator rod passage extending from the outer surface into the internal cavity that is adapted to receive at least a portion of the actuator rod and a valve stem passage extending from the outer surface into the internal cavity that is adapted to receive at least a portion of the valve stem. The apparatus also includes a load relieving body disposed within the internal cavity between the actuator rod passage and the valve stem passage.

In accordance with another example, an apparatus for coupling shafts includes a connector housing including a first portion and a second portion. Each of the first and second portions includes first and second angled surfaces adapted to engage ends of first and second shafts when the first portion is removably coupled to the second portion. The apparatus also includes one of a wedge, a cam, or a tapered rod configured to be coupled to at least one of the first or second housing portions between the first and second shaft ends and further configured to be adjustable to cause the angled surfaces to securely engage the ends of the first and second shafts.

In accordance with yet another example, an apparatus for coupling shafts includes first means for coupling a first shaft end to a second shaft end and second means for coupling the first shaft end to the second shaft end and for coupling to the first means for coupling. The apparatus further includes means for adjustably moving the first and second shaft ends to securably engage the first and second means for coupling.

BRIEF DESCRIPTION OF THE DRAWINGS

FIG. 1 is a cross-sectional view of a known valve stem connector incorporated into a control valve assembly.

FIG. 2 is an exploded view of the known valve stem connector shown in FIG. 1.

DETAILED DESCRIPTION

Figure 3:
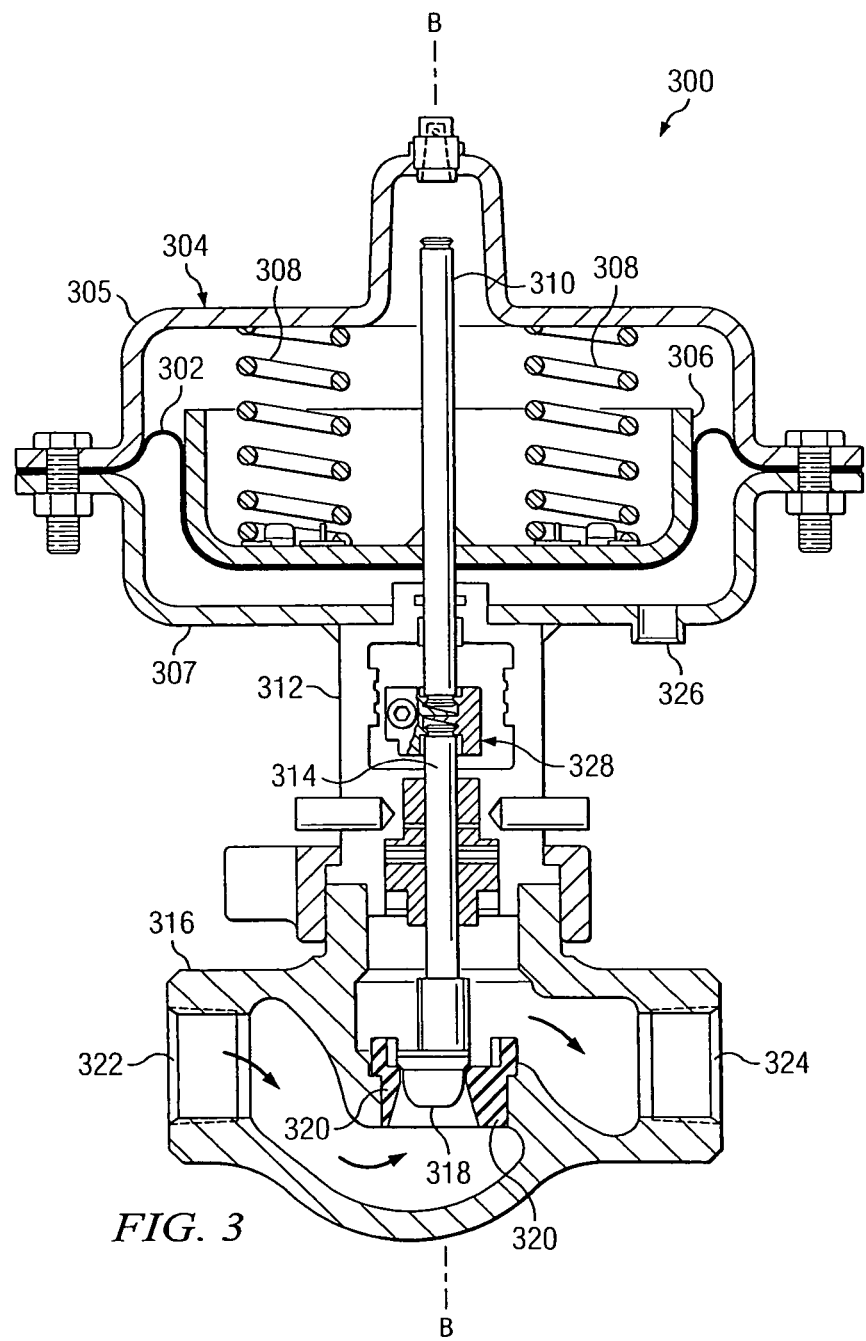
FIG. 3 is a cross-sectional view of an example valve assembly with an example valve stem connector.

Referring now to the drawings, FIG. 3 shows an example control valve 300. The valve 300 includes a diaphragm 302 located inside a diaphragm casing 304. Above the diaphragm 302 is a plate 306 that is coupled to actuator springs 308 and an actuator rod 310. The actuator rod 310 extends from the diaphragm casing 304 through a yoke 312 where the actuator rod 310 is coupled to a valve stem 314. The valve stem 314 extends through the yoke 312 into a valve body 316 and is coupled to a plug 318. The plug 318 engages a valve seat 320 when the valve is closed, which blocks the flow of process fluid from an inlet 322 to an outlet 324.

To increase pressure in the diaphragm casing 304, a fluid such as, for example, air, is forced into the casing 304 under the diaphragm 302 through a port 326. The example diaphragm casing 304 includes an upper casing 305 and a lower casing 307. In the illustrated example, the port 326 is associated with the lower casing 307. In alternative examples, the port 326 may be associated with the upper casing 305 and the springs 308 may be located between the plate 306 and the lower casing 307. The air forced through the port 324 increases the pressure and moves the diaphragm 302 and plate 306 upward, which compresses the springs 308. As the plate 306 and the diaphragm 302 move upward, the actuator rod 310 and the valve stem 314 also move up along the B-B axis. The lifting of the valve stem 314 lifts the plug 318 from the valve seat 320, which allows a process fluid to flow from the inlet 322 past the plug 318 to the outlet 324 of the valve body 316.

Figure 4:
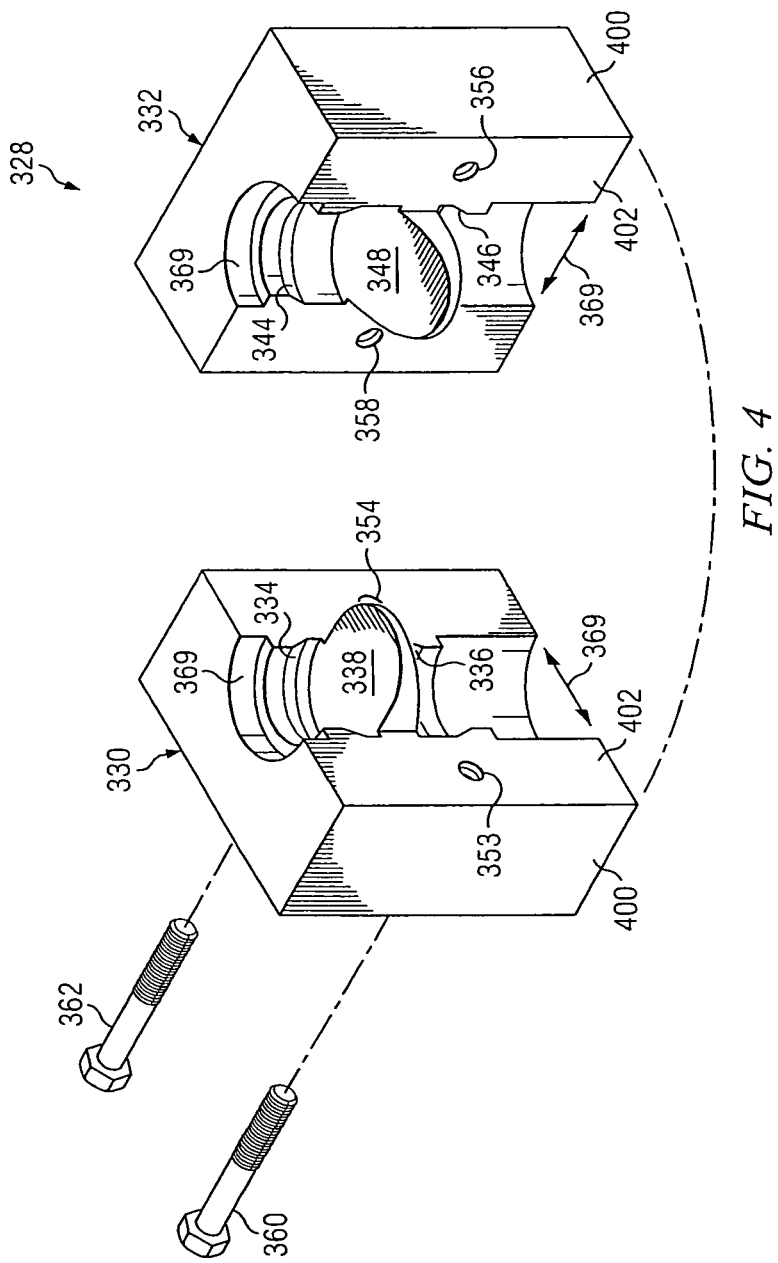
FIG. 4 is an exploded view of the valve stem connector of FIG. 3.
Figure 5:
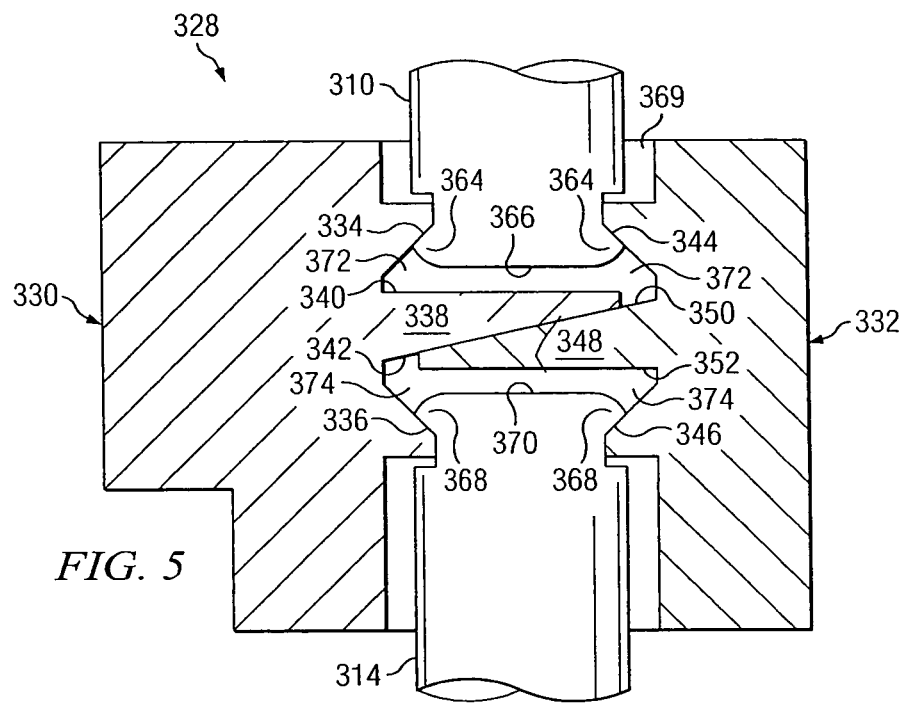
FIG. 5 is a cross-sectional view of the example valve stem connector of FIG. 4.

In this embodiment, the apparatus for operatively connecting the actuator rod 310 to the valve stem 314 is a valve stem connector 328, which is shown in greater detail in FIGS. 4 and 5. The valve stem connector 328 includes a connector housing formed in this example by two portions 330, 332 each having an outer surface 400 and an inner surface 402, where the inner surfaces 402 cooperate to define an internal cavity 369. The top portion of the internal cavity 369 forms an actuator rod passage 372 (FIG. 5) that extends from the outer surface 400 into the internal cavity 369 and is adapted to receive at least a portion of the actuator rod 310. The bottom portion of the internal cavity 369 forms a valve stem passage 374 that extends from the outer surface 400 into the internal cavity 369 and is adapted to receive at least a portion of the valve stem 314. The valve stem connector 328 also includes a load relieving body in this example formed by cooperating wedges 338, 348 disposed within the internal cavity 369 between the actuator rod passage 372 and the valve stem passage 374. Further, the wedges 338, 348 form a surface 352 configured to contact an end 370 of the valve stem 314, and an opposing surface 340 configured to contact an end 366 of the actuator rod 310.

As noted, the example valve stem connector 328 includes a first connector portion or housing 330 and a second connector portion or housing 332. The first connector portion 330 has a first upper sloped wall 334 and a first lower sloped wall 336. The first connector portion 330 also has a first generally wedge-shaped projection 338 extending radially outward from the outer surface 400 into the internal cavity 369. The first wedge 338 has a first substantially flat surface 340 and a first angled surface 342 shown best in FIG. 5. Likewise, the second connector portion 332 has a second upper sloped wall 344 and a second lower sloped wall 346. The second connector portion 332 also has a second generally wedge-shaped projection 348, but the second wedge 348 of the second connector portion 332 is complementary to the first wedge 338 of the first connector portion 330 such that the wedges 338, 348 engage to form a load relieving body with substantially co-planar surfaces. The second wedge 348 also has non-coplanar surfaces, i.e., a second angled surface 350 above a second substantially flat surface 352.

As shown in FIG. 4, the first connector portion 330 has a first aperture 353 and a second aperture 354. The second connector portion 332 has a third aperture 356 and a fourth aperture 358. To releasably join the first connector portion 330 and the second connector portion 332, a first bolt 360 is inserted through the first aperture 353 and the third aperture 356, and a second bolt 362 is inserted through the second aperture 354 and the fourth aperture 358. Though the illustrated example uses bolts 360, 362 to join the connector portions 330, 332, any known mechanical fastener may also be used. Furthermore, though two fasteners 360, 362 are shown, any number of fasteners may be used, e.g., 1, 3, 4, etc. In addition, the apertures 353, 354, 356, 358 may be angled such that the fasteners 360, 362 may only be secured when the apertures 353, 354, 356, 358 are properly aligned, thereby ensuring that the connector portions 330, 332 are oriented so that the wedges 338, 348 complement each other and function properly.

Returning to FIG. 5, the actuator rod 310 has a first undercut 364 adjacent to and acutely angled with respect to a first mating surface 366. Similarly, the valve stem 314 has a second undercut 368 adjacent to and acutely angled with respect to a second mating surface 370. As the connector portions 330, 332 are joined and as the bolts 360, 362 are tightened in the apertures 353, 354, 356, 358, the wedges 338, 348 make contact with each other. As the union between the two connector portions 330, 332 further tightens, the angled surfaces 342, 350 slide along each other. Concurrently, the upper sloped walls 334, 344 engage the undercut 364 of the actuator rod 310, while the lower sloped walls 336, 346 engage the undercut 368 of the valve stem 314. As the sloped walls 334, 336, 344, 346 engage the undercuts 364, 368, the actuator rod 310 and the valve stem 314 become coupled, and ultimately the first mating surface 366 of the actuator rod 310 at least partially contacts the first substantially flat surface 340 of the first wedge 338. Similarly, the second mating surface 370 of the valve stem 314 at least partially contacts the second substantially flat surface 352 of the second wedge 348.

The actuator rod 310 and the valve stem 314 may vary in length based on manufacturing tolerances. The wedges 338, 348 in the valve stem connector assembly 328 accommodate varying lengths of actuator rods and valve stems without requiring additional or separate components so the valve 300 will function properly. For example, if one or both of the actuator rod 310 and/or the valve stem 314 are on the longer side of the manufacturing tolerances, the angled surfaces 342, 350 engage each other less (i.e., have a smaller engagement or contact surface area) and the connector portions 330, 332 do not need to be tightened as much to create a secure connection. If one or both of the actuator rod 310 and/or the valve stem 314 are on the shorter side, the angled surfaces 342, 350 engage each other more, and the connector portions 330, 332 are tightened closer to one other for a secure connection. Accordingly, the valve stem connector 328 can accommodate a variety of lengths of actuator rods 310 and/or valve stems 314 by, in effect, lengthening or shortening the overall length of the actuator rod 310 and/or valve stem.

The ability of the stem connector 328 to lengthen or shorten the overall length of the actuator rod 310 and/or valve stem 314 is also particularly beneficial for relieving spring load and/or compressing the actuator springs 308 as needed for maintenance. For example, when the actuator rod 310 and the valve stem 314 need to be separated such as, for example, when the valve 300 needs maintenance during an outage, the stem connector 328 is disassembled. In this example, the bolts 360, 362 are removed, and the two connector portions 330, 332 and, thus, the wedges 338, 348 are separated. Then, the distance between the two mating surfaces 366, 370 is no longer occupied by the wedges 338, 348. Consequently, the load experience by the actuator rod 310 and the valve stem 314 is relieved, the actuator rod 310 and the valve stem 314 are no longer coupled, and the actuator rod 310 and the valve stem 314 can be moved independently of each other. This allows the valve stem 314 and the plug 318 to be removed from the valve seat 320 manually (i.e., without the need for power or air to compress the springs 308 and lift the actuator rod 310). Essentially, the first wedge 338 and the second wedge 348 form a load relieving body that relieves the load in the springs 308 so the actuator rod 310 can freely disassociate from the valve stem 314. Without the spring load exerting a downward force, the valve stem 314 and the plug 318 can be moved away from the valve seat 320. As a result, the valve 300 may be disassembled during unanticipated outages without damage.

In addition to accommodating manufacturing tolerances with respect to the length of the actuator rod 310 and the length of the valve stem 314, the stem connector 328 can accommodate axial misalignment of the actuator rod 310 and the valve stem 314. Both connector portions 330, 348 are positioned to enclose or surround the ends of the actuator rod 310 and the valve stem 314. The stem connector 328, when fully assembled, forms the internal cavity 369, as described above, which includes the actuator rod passage 372 and the valve stem passage 374. The actuator rod passage 372 has a diameter larger than the diameter of the first undercut 364. Similarly, the valve stem passage 374 has a diameter larger than the diameter of the second undercut 368. The resulting gaps accommodate axial misalignment between the actuator rod 310 and the valve stem 314. The actuator rod 310 and/or the valve stem 314 may be shifted to the left and/or the right within the internal cavity 369 without affecting the performance of the valve 300. The internal cavity 369 may be sized to accommodate various magnitudes of axial misalignment.

Figure 7:
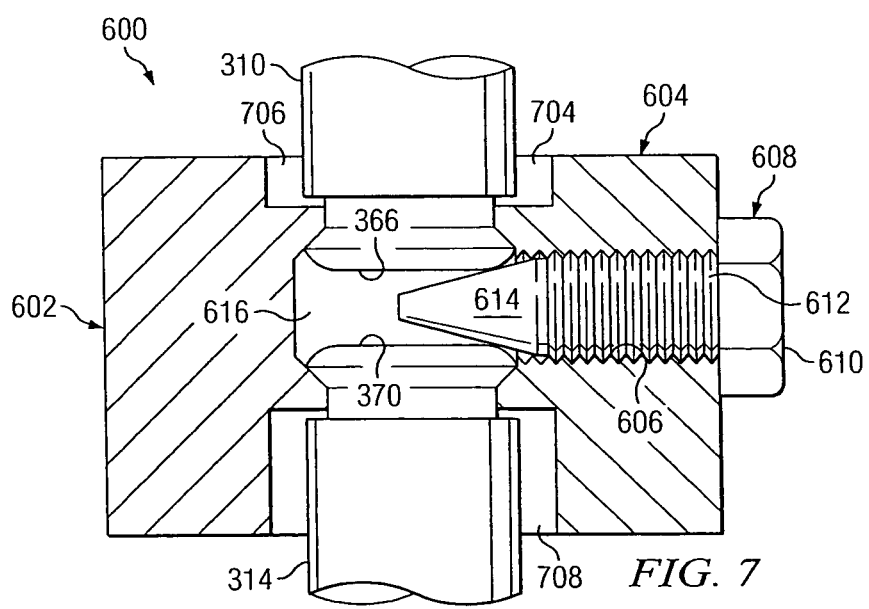
FIG. 7 is a cross-sectional view of the example valve stem connector of FIG. 6.
Figure 6:
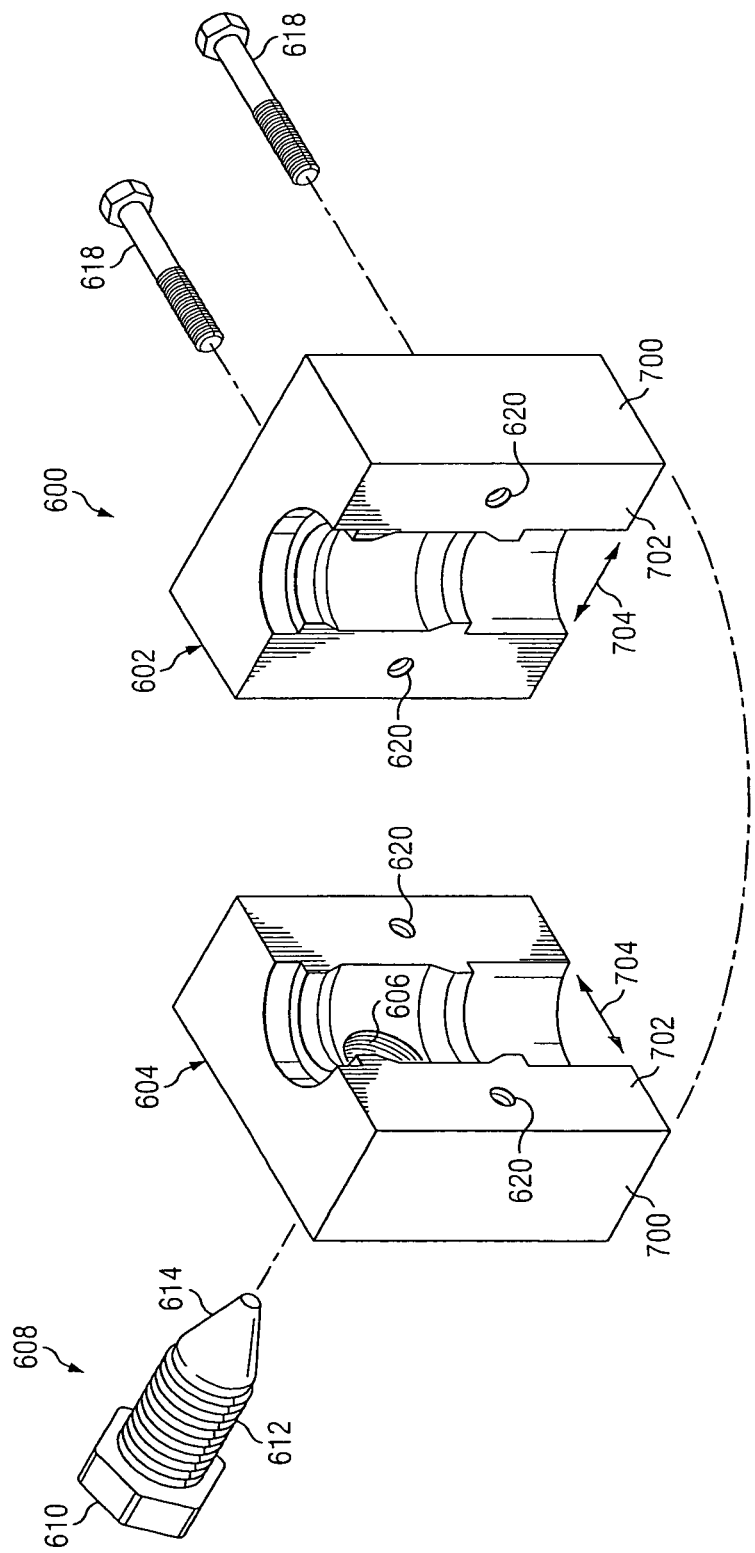
FIG. 6 is an exploded view of an alternative example valve stem connector.

FIGS. 6 and 7 illustrate an alternative example stem connector 600. The valve stem connector 600 includes a connector housing formed in this example by two portions 602, 604 each having an outer surface 700 and an inner surface 702, where the inner surfaces 702 cooperate to define an internal cavity 704. The top portion of the internal cavity 704 forms an actuator rod passage 706 that extends from the outer surface 700 into the internal cavity 704 that is adapted to receive at least a portion of the actuator rod 310, and the bottom portion of the internal cavity 704 forms a valve stem passage 708 that extends from the outer surface 700 into the internal cavity 704 that is adapted to receive at least a portion of the valve stem 314. The valve stem connector 600 also includes a load relieving body 608 disposed within the internal cavity 704 between the actuator rod passage 706 and the valve stem passage 708. The load relieving body 608 has a surface 614 configured to contact an end 370 of the valve stem 314 and an end 366 of the actuator rod 310.

The connector portion 604 has an opening 606 through which the load relieving body or projection 608 is inserted. The projection 608 has a head 610 that can be manipulated by a wrench, pliers or other tool to adjustably insert or remove the projection 608 into/from the opening 606. The projection 608 further has a body section 612 that traverses the connector portion 604. In the illustrated example, the body section 612 has threads that engage threads in the opening 606. The projection 608 ends in the surface or angled structure 614 creating a tapered rod, which may be generally wedge-shaped, conically shaped, or any other combination of shapes with a sloping, rounded or curved surface. The angled structure 614 engages the mating surfaces 366, 370 of the actuator rod 310 and the valve stem 314, respectively, as described above.

As the projection 608 is inserted further into the connector portion 604, a greater thickness of the wedge 614 is inserted between the actuator rod 310 and the valve stem 314. Because the projection 608 may be inserted into the valve stem connector 600 to varying degrees to create a full assembly, this example can accommodate manufacturing tolerances in the lengths of the actuator rod 310 and the valve stem 314 and can, in effect, lengthen or shorten the actuator rod 310 and/or valve stem 314, similar to the stem connector 328 described above. For example, if the actuator rod 310 and/or the valve stem 312 are on the long side of their respective tolerances, they will be closer to one another (i.e., the gap 616 will be smaller). When the gap 616 is smaller, the projection 608 need not be inserted as far into the stem connector 600 for a secure fit. If the actuator rod 310 and/or the valve stem 312 are on the short side of their respective tolerances, they will be further from one another (i.e., the gap 616 will be larger). When the gap 616 is larger, the projection 608 may be inserted more deeply into the stem connector 600 for a secure fit.

The connector portions 602, 604 each have passages 706, 708 and sloped walls similar to those described above in connection with the stem connector 328. The passages 706, 708 with the plurality of sloped walls engage the rods 310, 314 and guide the rods 310, 314 toward the wedge surface 614 and into alignment with each other. Accordingly, the stem connector 600 accommodates axial misalignment of the actuator rod 310 and the valve stem 314 by virtue of the sloped walls and the passages 706, 708.

The stem connector 600 may be manually disassembled by removing the projection 608 and separating the connector portions 602, 604. Removing the projection 608 relieves the spring load and allows the actuator rod 310 and the valve stem 314 to be mechanically decoupled and, if needed, to be moved independently of each other. This allows the valve stem 314 and the plug 318 to be removed from the valve seat 320 manually (i.e., without the need for power or air to compress the springs 308 and lift the actuator rod 310). As a result, the valve 300 may be disassembled during unanticipated outages without damage.

In an alternative example (not shown), the projection 608 may be integrally formed in one of the connector portions 602, 604 and disposed in the internal cavity 704. In this alternative example, the stem connector 600 is assembled and tightened by bolts 618, which run through apertures 620 in a similar manner as described above in connection with the stem connector 328.

Figure 8:
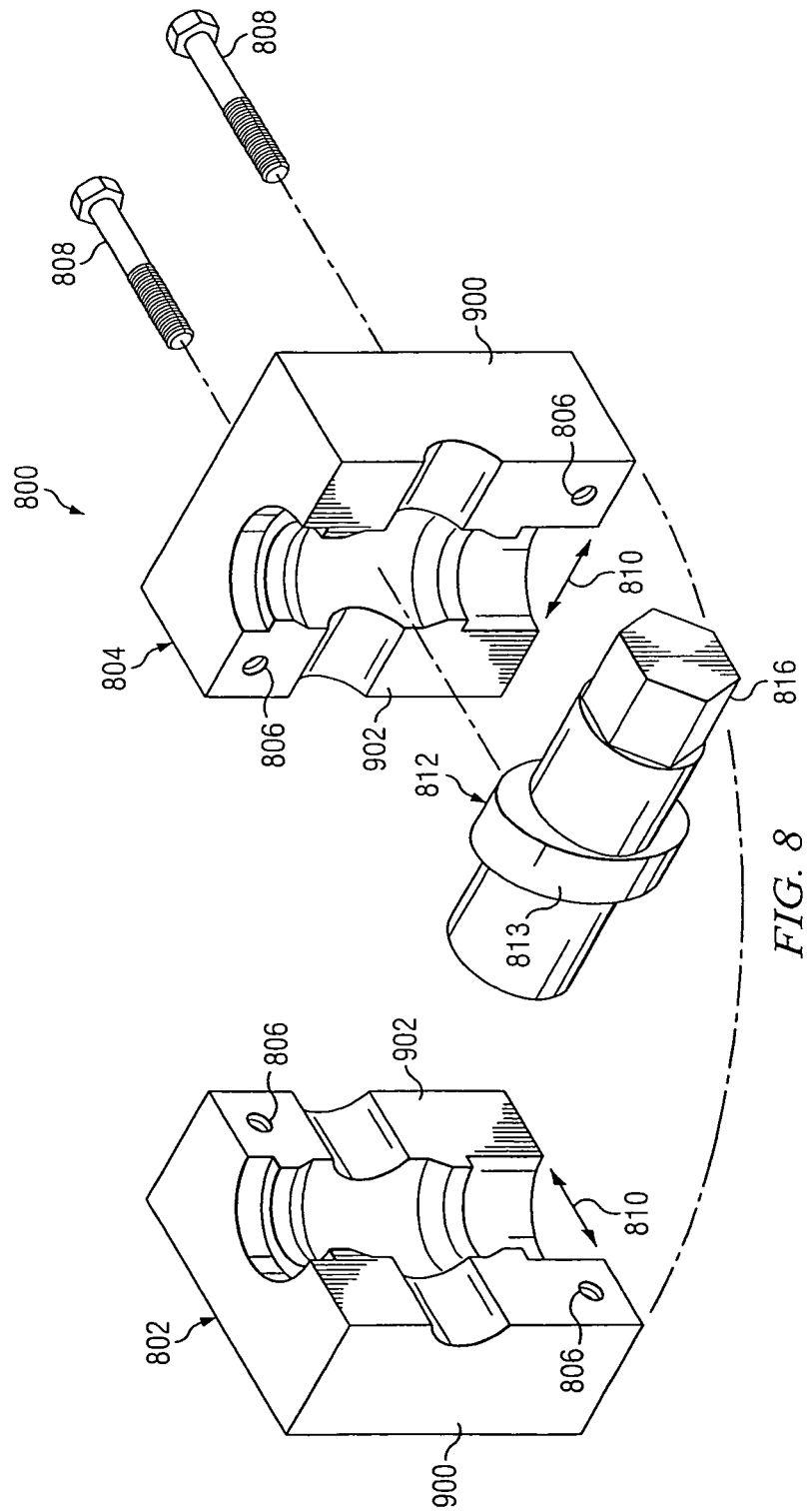
FIG. 8 is an exploded view of another alternative example valve stem connector.
Figure 9:
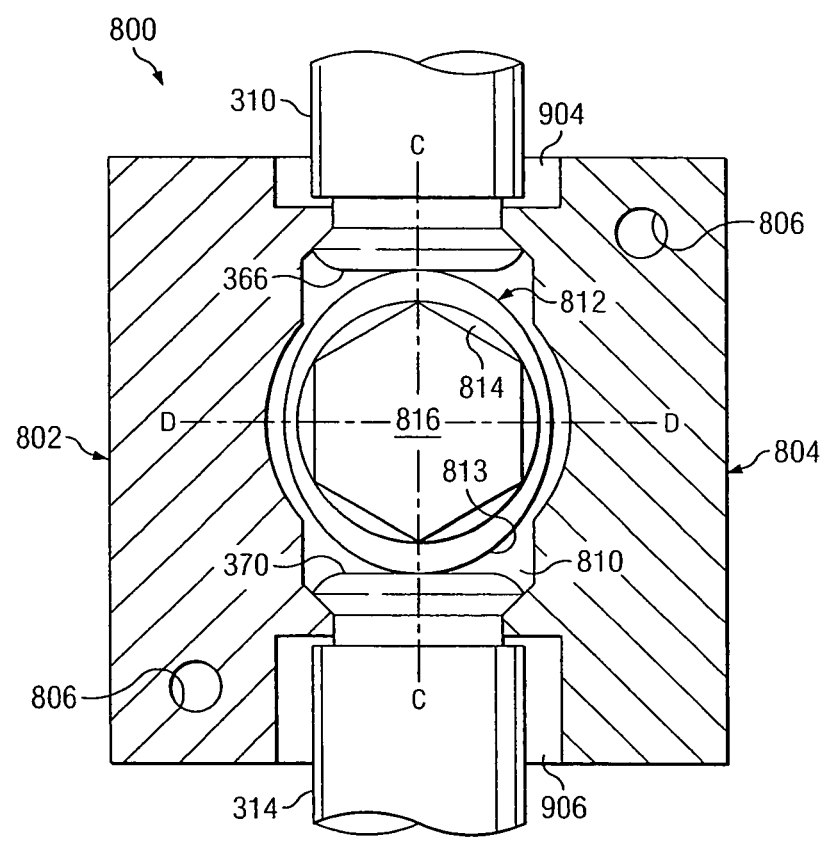
FIG. 9 is cross-sectional view of the example valve stem connector of FIG. 8.

FIGS. 8 and 9 illustrate a third example stem connector 800. The valve stem connector 800 includes a connector housing formed in this example by two portions 802, 804, each having an outer surface 900 and an inner surface 902, where the inner surfaces 902 cooperate to define an internal cavity 810. The top portion of the internal cavity 810 forms an actuator rod passage 904 that extends from the outer surface 900 into the internal cavity 810 that is adapted to receive at least a portion of the actuator rod 310, and the bottom portion of the internal cavity 810 forms a valve stem passage 906 that extends from the outer surface 900 into the internal cavity 810 that is adapted to receive at least a portion of the valve stem 314. The valve stem connector 328 also includes a load relieving body 812 disposed within the internal cavity 810 between the actuator rod passage 904 and the valve stem passage 906. Further, the load relieving body 812 has a surface 813 configured to contact an end 370 of the valve stem 314, and an end 366 of the actuator rod 310.

Both of the connector portions 802, 804 have apertures 806 through which bolts 808 are inserted to releasably connect the two connector portions 802, 804. Though bolts 808 are illustrated in FIG. 9, any known removable mechanical fastener may be used. Further, although four apertures 806 and two bolts 808 are shown, any number of apertures and bolts can be used, e.g., 1, 2, 3, 4, etc.

When the two portions 802, 804 are connected, the internal cavity 810 is formed therebetween. The cavity 810 is sized to accommodate the actuator rod 310 and the valve stem 314. As stated above, the cavity 810 includes spring load relieving structure or a cam 812. In the illustrated example, the cam 812 is ellipsoidal and has an open center 814 in which a shaft 816 is inserted. In the illustrated example, the shaft 816 is a hex shaft, but any shaft that can be manipulated by a wrench, pliers or other tool may be used.

When the shaft 816 is rotated, the cam 812 is also rotated, and rotation of the cam 812, in effect, lengthens or shortens the actuator rod 310 and/or valve stem 314. When the cam 812 is rotated so that the major axis of the ellipsoid, the C-C axis is oriented as shown in FIG. 9, the surface 813 of the cam 812 engages the mating surfaces 366, 370 of the actuator rod 310 and valve stem 314, respectively, and the actuator rod 310 and valve stem 314 are at their longest lengths. To disassemble the stem connector 800, the cam 312 is turned so that the minor axis of the ellipsoid, the D-D axis, is aligned with the axes of the actuator rod 310 and the stem connector 314, and the actuator rod 310 and valve stem 314 are at their shortest lengths. In fact, in this position, the spring load is relieved and there is enough slack between the actuator rod 310 and the valve stem 314 so that valve 300 can be disassembled manually (i.e., without the need for power or air). This allows the valve 300 to be disassembled during unanticipated outages.

As described above, rotation of the cam 812 lengthens or shortens the actuator rod 310 and/or the valve stem 314, which enables the stem connector 800 to accommodate manufacturing tolerances in the lengths of the actuator rod 310 and the valve stem 314. The distance between the mating surfaces 366, 370 of the actuator rod 310 and the valve stem 314, respectively, varies as a function of the position of the cam 812. For example, when the cam 812 is positioned so that the C-C axis is aligned with the axis of the actuator rod 310 and the valve stem 314 (FIG. 8), the distance between the actuator rod 310 and the valve stem 314 is the greatest. When the cam 812 is positioned such that the D-D axis is aligned with the actuator rod 310 and the valve stem 314, the distance between the actuator rod 310 and the valve stem 314 is the shortest. To fully engage the mating surfaces 366, 370, the position of the cam 812 between the D-D axis and the C-C axis will vary depending on the lengths of the actuator rod 310 and/or the valve stem 314 relative to their manufacturing tolerances. Additionally, the stem connector 800 can accommodate axial misalignments in a manner similar to the stem connector 328 described above.

Although certain example apparatus and articles of manufacture have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. An apparatus for operatively connecting an actuator rod to a valve stem, the apparatus comprising:
   a connector housing having a first housing portion having a first outer surface and a first inner surface and a second housing portion having a second outer surface and a second inner surface, the first inner surface and the second inner surface defining an internal cavity;
   an actuator rod passage formed from a first portion of the internal cavity, the actuator rod passage adapted to receive at least a portion of the actuator rod;
   a valve stem passage formed from a second portion of the internal cavity, the valve stem passage adapted to receive at least a portion of the valve stem; and
   a load relieving body disposed within the internal cavity between the actuator rod passage and the valve stem passage, the load relieving body comprising:
      a first surface to engage an end of the actuator rod, the first surface extending from at least one of the first inner surface or the second inner surface; and
      a second surface to engage an end of the valve stem, the second surface extending from at least one of the first inner surface or the second inner surface, wherein the first surface and the second surface are movable at least one of toward or away from a longitudinal axis of the actuator rod and the valve stem to change an effective length of at least one of the valve stem or the actuator rod.

2. An apparatus as defined in claim 1, wherein the connector housing further comprises:
   a first aperture in the first housing portion;
   a second aperture in the second housing portion; and
   a fastener that is inserted into the first and second apertures when the first and second apertures are aligned to releasably couple the first and second housing portions.

3. An apparatus as defined in claim 2, wherein the first and second apertures are angled so that the fastener may only couple the first and second housing portions when the first and second housing portions are aligned to align the first and second apertures.

4. An apparatus as defined in claim 1, wherein the load relieving body is integrally coupled to the connector housing.

5. An apparatus as defined in claim 1, wherein the first surface and the second surface are non-coplanar surfaces.

6. An apparatus as defined in claim 1, wherein the load relieving body is generally wedge-shaped.

7. An apparatus as defined in claim 6, wherein the generally wedge-shaped load relieving body includes a first wedge portion coupled to the first housing portion and second wedge portion coupled to the second housing portion.

8. An apparatus as defined in claim 7, wherein the first wedge portion comprises the first surface and a first sloped surface and the second wedge portion comprises the second surface and a second sloped surface.

9. An apparatus as defined in claim 8, wherein the first and the second sloped surfaces contact when the connector housing is assembled.

10. An apparatus as defined in claim 1, wherein the load relieving body has at least one rounded surface.

11. An apparatus as defined in claim 1, wherein the connector housing is adapted to accommodate axial misalignment between the actuator rod and the valve stem.

12. An apparatus as defined in claim 1, wherein the load relieving body is to relieve or compress an actuator spring.

13. An apparatus as defined in claim 1, wherein the load relieving body comprises:
   a first portion comprising the first surface and a third surface; and
   a second portion comprising the second surface and a fourth surface, wherein the third surface and the fourth surface are slidably coupled.

14. An apparatus as defined in claim 13, wherein the first portion is a wedge shaped portion and the second portion is a wedge shaped portion.

15. An apparatus as defined in claim 1, wherein at least one of the actuator rod or the valve stem are to move relative to the housing along the longitudinal axis when the first surface and the second surface move at least one of toward or away from the longitudinal axis.

16. An apparatus for coupling an actuator rod to a valve stem, comprising:
   a connector housing including a first portion and a second portion, wherein each of the first and second portions includes first and second angled surfaces adapted to engage at least one of an end of the actuator rod or an end of the valve stem when the first portion is removably coupled to the second portion; and
   a load relieving body extending from an inner surface of the first housing portion and an inner surface of the second housing portion between the end of the actuator rod and the end of the valve stem, the load relieving body comprising a first load relieving surface and a second load relieving surface, the first and second load relieving surfaces disposed between the end of the actuator rod and the end of the valve stem, the first and second load relieving surfaces slidably or rotatably-adjustable to cause the angled surfaces to securely engage at least one of the end of the actuator rod or the end of the valve stem,
   wherein the load relieving body lengthens or shortens the overall length of at least one of the actuator rod or the valve stem.

17. An apparatus as defined in claim 16, wherein the load relieving body comprises a wedge.

18. The apparatus as define in claim 16, wherein the load relieving body comprises a rounded surface.

19. An apparatus as defined in claim 16, wherein the angled surfaces are adapted to engage undercut portions of the end of the actuator rod and the end of the valve stem.

20. An apparatus as defined in claim 16, wherein the first and second housing portions comprise complementary portions.

21. An apparatus as defined in claim 16, wherein the load relieving body is to couple the end of the actuator rod and the end of the valve stem.

22. An apparatus as defined in claim 16, wherein the load relieving surface is an angled surface.

23. An apparatus as defined in claim 16, wherein the load relieving body relieves a load experienced by at least one of the end of the actuator rod or the end of the valve stem.

24. An apparatus as defined in claim 16, wherein the load relieving body is integral with the connector housing.

25. An apparatus as defined in claim 16, wherein the load relieving body is disposed only between the end of the actuator rod and the end of the valve stem.

26. An apparatus for operatively connecting an actuator rod to a valve stem, the apparatus comprising:
   a connector housing having a first housing portion and a second housing portion, each of the first housing portion and the second housing portion having an outer surface and an inner surface, the inner surfaces defining an internal cavity;
   an actuator rod passage formed from a first portion of the internal cavity, the actuator rod passage adapted to receive at least a portion of the actuator rod;
   a valve stem passage formed from a second portion of the internal cavity, the valve stem passage adapted to receive at least a portion of the valve stem; and
   a load relieving body disposed within the internal cavity between the actuator rod passage and the valve stem passage, the load relieving body comprising:
      a first wedge portion having a first surface and a second surface, the first wedge portion extending from the inner surface of the first housing portion; and
      a second wedge portion having a third surface and a fourth surface, the second wedge portion extending from the inner surface of the second housing portion,
   wherein the first surface, the fourth surface, an end of the actuator rod and an end of the valve stem are parallel, and
   wherein the second surface and the third surface are slidably coupled to change an effective length of at least one of the valve stem or actuator rod.

27. An apparatus as defined in claim 26, wherein the first surface is to contact the end of the valve stem and the fourth surface is to contact the end of the actuator rod.

* * * * *

UNITED STATES PATENT AND TRADEMARK OFFICE
CERTIFICATE OF CORRECTION

PATENT NO.        : 8,696,231 B2
APPLICATION NO.   : 11/314620
DATED             : April 15, 2014
INVENTOR(S)       : Michael Wildie McCarty et al.

It is certified that error appears in the above-identified patent and that said Letters Patent is hereby corrected as shown below:

In the Claims:

Claim 18, Column 9, Line 45:
replace "define" with --defined--.

Signed and Sealed this
First Day of July, 2014

Michelle K. Lee
*Deputy Director of the United States Patent and Trademark Office*